United States Patent
Xu et al.

(10) Patent No.: US 10,108,881 B2
(45) Date of Patent: Oct. 23, 2018

(54) TRAIN TYPE IDENTIFICATION METHOD AND SYSTEM, AND SECURITY INSPECTION METHOD AND SYSTEM

(71) Applicant: Nuctech Company Limited, Beijing (CN)

(72) Inventors: Yanwei Xu, Beijing (CN); Weifeng Yu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/278,458

(22) Filed: Sep. 28, 2016

(65) Prior Publication Data
US 2017/0161586 A1    Jun. 8, 2017

(30) Foreign Application Priority Data
Dec. 8, 2015    (CN) .......................... 2015 1 0896409

(51) Int. Cl.
*G06K 9/62*    (2006.01)
*H04N 7/18*    (2006.01)
(Continued)

(52) U.S. Cl.
CPC ....... *G06K 9/6202* (2013.01); *G06K 9/00771* (2013.01); *G06K 9/4604* (2013.01);
(Continued)

(58) Field of Classification Search
CPC ............. G06K 9/6202; G06K 9/00771; G06K 9/4604; G06K 9/6215; G06T 7/0081; G06T 2207/10016; H04N 7/183
See application file for complete search history.

(56) References Cited

U.S. PATENT DOCUMENTS

| 4,876,597 A | 10/1989 | Roy et al. |
| 2008/0310754 A1* | 12/2008 | Safai ...................... G01B 15/04 382/275 |

(Continued)

FOREIGN PATENT DOCUMENTS

| CN | 101468651 A | 7/2009 |
| CN | 201753064 U | 3/2011 |

(Continued)

OTHER PUBLICATIONS

Extended European Search Report dated May 4, 2017 received in European Application No. 16 19 1363.7.
(Continued)

*Primary Examiner* — Qian Yang
(74) *Attorney, Agent, or Firm* — Scully, Scott, Murphy & Presser, P.C.

(57) ABSTRACT

The present disclosure relates to a train type identification method and system, and a security inspection system and system. The train type identification method includes: continuously photographing a to-be-inspected train by using a linearity camera in motion relative to the to-be-inspected train, and generating a plurality of train sub-images; splicing the plurality of train sub-images to acquire a train image of the to-be-inspected train; extracting at least one train characteristic parameter from the train image; comparing the at least one train characteristic parameter with a prestored train type template; and automatically determining a type of the to-be-inspected train based on a comparison result.

16 Claims, 6 Drawing Sheets

(51) Int. Cl.
*G06T 7/00* (2017.01)
*G06K 9/46* (2006.01)
*G06K 9/00* (2006.01)

(52) U.S. Cl.
CPC .......... *G06K 9/6215* (2013.01); *G06T 7/0081* (2013.01); *H04N 7/183* (2013.01); *G06T 2207/10016* (2013.01)

(56) References Cited

U.S. PATENT DOCUMENTS

2009/0034789 A1\* 2/2009 Wang ..................... G08G 1/015
 382/103
2014/0156123 A1 6/2014 Cooper et al.
2016/0019683 A1\* 1/2016 You .......................... G06T 7/74
 382/103

FOREIGN PATENT DOCUMENTS

| | | |
|---|---|---|
| CN | 102854191 A | 1/2013 |
| CN | 103794056 A | 5/2014 |
| CN | 104374785 A | 2/2015 |
| CN | 204314236 U | 5/2015 |
| CN | 105046968 A | 11/2015 |
| EP | 1 970 700 A1 | 9/2008 |
| JP | 2015-145186 A | 8/2015 |
| RU | 2 280 580 C2 | 7/2006 |

OTHER PUBLICATIONS

Eurasian Search Report dated May 18, 2017 received in Eurasian Application No. 201691867, together with an English-language translation.

\* cited by examiner

TRAIN TYPE IDENTIFICATION METHOD AND SYSTEM, AND SECURITY INSPECTION METHOD AND SYSTEM

TECHNICAL FIELD

The present disclosure relates to the field of train security inspection, and in particular, to a train type identification method and system, and a train security inspection method and system.

BACKGROUND

Train type identification has been widely applied in practice, for example, the train security inspection or train repairing field. In the train security inspection field, different train types may be distinguished to determine whether a to-be-inspected train carries passengers, such that different X-ray dosages may be defined, or a carriage carrying no passenger is subject to X-ray scanning whereas a carriage carrying passengers is not subject to X-ray scanning. This requires identification of train types first to determine whether a train entering the inspection region is a locomotive or a passenger train carrying passengers.

The train types are categorized into locomotive, passenger train, freight train and the like. The freight trains are finely categorized into container freight train, cargo train, oil tank train, trailer train and the like. Trains of different types have different wheelbases, heights, carrying objects (for example, the carrying objects of different types of trains may be one or more of passengers, solid goods, liquid goods and the like). In a train type identification method, a plurality of train inspection points are arranged along a railway, and magnetic steel is deployed on the railway at each train inspection point. A relative speed and a shaft position of the train are detected by the magnetic steel to determine the wheelbase. Passenger trains are distinguished from the freight trains based on different wheelbases. However, different countries have stipulated different standards for train carriages, such that trains of a same type may not necessarily have the same wheelbase. Therefore, carriages of the same type in different countries may not be identified by using the wheelbase measurement method. In addition, sometimes the carriages are refitted (for example, the passenger carriages are refitted to thermal insulation carriages which carry cargos instead of passengers), such that the carrying objects change but the wheelbase generally remains the same. As such, the carrying objects of the carriages may not be identified by means of measuring the wheelbase.

Hence, a new train type identification method and a new security inspection method are desired.

The above information disclosed in the background portion is only used to reinforce understanding of the background of the present disclosure. Therefore, the above information may include information that is not prior arts known to persons of ordinary skill in the art.

SUMMARY

The present disclosure provides a train type identification method and system, and a train security inspection method and system, which are capable of implementing automatic identification of train types.

Other characteristics, features, and advantages of the present disclosure will become apparent through the following detailed description, or will be partially learned from practice of the present disclosure.

According to one aspect of the present disclosure, a train type identification method is provided. The method includes: continuously photographing a to-be-inspected train by using a line-scan camera in motion relative to the to-be-inspected train, and generating a plurality of train sub-images; splicing the plurality of train sub-images to acquire a train image of the to-be-inspected train; extracting at least one train characteristic parameter from the train image; comparing the at least one train characteristic parameter with a prestored train type template; and automatically determining a type of the to-be-inspected train based on a comparison result.

According to an exemplary embodiment, the type includes at least one of locomotive, passenger train and freight train.

According to an exemplary embodiment, the automatically determining a type of the to-be-inspected train based on a comparison result includes: selecting, based on a predetermined similarity weight of each of the at least one train characteristic parameter, a type template having a maximum similarity with the train image of the to-be-inspected train and having the similarity exceeding a predetermined threshold, to determine the type of the to-be-inspected train.

According to an exemplary embodiment, the at least one train characteristic parameter includes at least one of wheelbase, train height, train profile, the quantity of windows, train color, and the quantity of shafts.

According to an exemplary embodiment, the line-scan camera continuously photographs the to-be-inspected train at a photographing frequency calculated based on a relative speed of the to-be-inspected train.

According to an exemplary embodiment, the line-scan camera continuously photographs the to-be-inspected train at a predetermined photographing frequency.

According to an exemplary embodiment, the splicing the plurality of train sub-images includes: defining contiguous time segments, and adjusting the quantity of train sub-images within each time segment based on a relative speed of the to-be-inspected train in each time segment, such that a proportion of the relative speed of the to-be-inspected train within each time segment and the quantity of train sub-images within the time segment remains consistent.

According to an exemplary embodiment, the adjusting the quantity of train sub-images within each time segment includes: if the relative speed of the to-be-inspected train is lower than a relative speed corresponding to the predetermined photographing frequency, subtracting, based on a predetermined rule, at least one train sub-image from the train sub-images acquired within the time segment; and if the relative speed of the to-be-inspected train is higher than the relative speed corresponding to the predetermined photographing frequency, adding at least one train sub-image into the train sub-images acquired within the time segment by means of interpolation.

According to an exemplary embodiment, the proportion of the relative speed of the to-be-inspected train within each time segment and the quantity of train sub-images within the time segment is determined by an object width identified by each imaging unit of the line-scan camera per second.

According to an exemplary embodiment, the splicing the plurality of train sub-images to acquire a train image of the to-be-inspected train further includes: performing distortion correction for the spliced image.

According to an exemplary embodiment, the performing distortion correction for the spliced image includes: extracting a wheel profile from the spliced image; acquiring a ratio of a wheel horizontal diameter and a wheel vertical diameter from the wheel profile; and if the ratio is greater than a first predetermined threshold, performing horizontal compression for the spliced image based on the ratio; and if the ratio is less than a second predetermined threshold, performing horizontal stretching for the spliced image based on the ratio.

According to an exemplary embodiment, the method further includes: identifying a coupler position of the train; and partitioning the train image into a plurality of train sub-images based on the coupler position.

According to another aspect of the present disclosure, a train type identification system is provided. The system includes: an image acquiring module, configured to continuously photograph a to-be-inspected train by using a line-scan camera in motion relative to the to-be-inspected train, and generate a plurality of train sub-images; an image splicing module, configured to splice the plurality of train sub-images to acquire a train image of the to-be-inspected train; a characteristic parameter extracting module, configured to extract at least one train characteristic parameter from the train image; a comparing module, configured to compare the at least one train characteristic parameter with a prestored train type template; and a type judging module, configured to automatically determine a type of the to-be-inspected train based on a comparison result.

According to an exemplary embodiment, the type includes at least one of locomotive, passenger train and freight train.

According to an exemplary embodiment, the type judging module is configured to: select, based on a predetermined similarity weight of each of the at least one train characteristic parameter, a type template having a maximum similarity with the train image of the to-be-inspected train and having the similarity exceeding a predetermined threshold, to determine the type of the to-be-inspected train.

According to an exemplary embodiment, the at least one train characteristic parameter includes at least one of wheelbase, train height, train profile, the quantity of windows, train color, and the quantity of shafts.

According to an exemplary embodiment, the system further includes a photographing control module, configured to continuously photograph the to-be-inspected train at a photographing frequency calculated based on a relative speed of the to-be-inspected train.

According to an exemplary embodiment, the image acquiring module acquires a plurality of train sub-images photographed by the line-scan camera at a predetermined photographing frequency.

According to an exemplary embodiment, the splicing module is further configured to define contiguous time segments, and adjust the quantity of train sub-images within each time segment based on a relative speed of the to-be-inspected train in each time segment, such that a proportion of the relative speed of the to-be-inspected train within each time segment and the quantity of train sub-images within the time segment remains consistent.

According to an exemplary embodiment, the adjusting the quantity of train sub-images within each time segment includes: if the relative speed of the to-be-inspected train is lower than a relative speed corresponding to the predetermined photographing frequency, subtracting, based on a predetermined rule, at least one train sub-image from the train sub-images acquired within the time segment; and if the relative speed of the to-be-inspected train is higher than the relative speed corresponding to the predetermined photographing frequency, adding at least one train sub-image into the train sub-images acquired within the time segment by means of interpolation.

According to an exemplary embodiment, the proportion of the relative speed of the to-be-inspected train within each time segment and the quantity of train sub-images within the time segment is determined by an object width identified by each imaging unit of the line-scan camera per second.

According to an exemplary embodiment, the image splicing module is further configured to extract a wheel profile from the spliced image, and perform distortion correction for the spliced image based on the wheel profile.

According to an exemplary embodiment, the performing distortion correction for the spliced image includes: extracting a wheel profile from the spliced image; acquiring a ratio of a wheel horizontal diameter and a wheel vertical diameter from the wheel profile; and if the ratio is greater than a first predetermined threshold, performing horizontal compression for the spliced image based on the ratio; and if the ratio is less than a second predetermined threshold, performing horizontal stretching for the spliced image based on the ratio.

According to an exemplary embodiment, the system further includes: a coupler identifying module, configured to identify a coupler position of the train; and an image partitioning module, configured to partition the train image into a plurality of train sub-images based on the coupler position.

According to still another aspect of the present disclosure, a train security inspection method is provided. The method includes: identifying a type of a to-be-inspected train entering an inspection region by using the train type identification method as described above; and if the to-be-inspected train is a locomotive or a passenger train, irradiating the to-be-inspected train with a low dosage or not irradiating the to-be-inspected train; and if the to-be-inspected train is a freight train, irradiating the to-be-inspected train with a high dosage.

According to yet still another aspect of the present disclosure, a train security inspection system is provided. The system includes: the train type identification system as described above; a radiation control module, configured to judge a type of a to-be-inspected train by using the train type identification system, control a ray source to irradiate the to-be-inspected train with a first dosage or not to irradiate the to-be-inspected train when the to-be-inspected train is a locomotive or a passenger train, and control the ray source to irradiate the to-be-inspected train with a second dosage when the to-be-inspected train is a freight train, wherein the first dosage is less than the second dosage.

According to further another aspect of the present disclosure, a train type identification system is provided. The system includes: a processor; and a memory for storing instructions executable by the processor; wherein the processor is configured to perform: continuously photographing a to-be-inspected train by using a line-scan camera in motion relative to the to-be-inspected train, and generating a plurality of train sub-images; splicing the plurality of train sub-images to acquire a train image of the to-be-inspected train; extracting at least one train characteristic parameter from the train image; comparing the at least one train characteristic parameter with a prestored train type template; and automatically determining a type of the to-be-inspected train based on a comparison result.

With the train type identification method and system, and the train security inspection method and system according to the present disclosure, automatic train type identification and train security inspection may be implemented, thereby achieving the advantages of high efficiency, easy-using and the like. In addition, automatic identification of refitted train may be implemented.

BRIEF DESCRIPTION OF THE DRAWINGS

Exemplary embodiments of the present disclosure will be described in detail with reference to the accompanying drawings, such that the above and other features and advantages of the present disclosure will become more apparent.

DETAILED DESCRIPTION

Figure 1A:
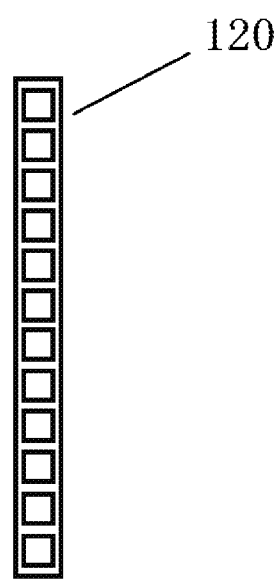
FIG. 1A schematically illustrates a line-scan camera for use in a train type identification apparatus according to some embodiments of the present disclosure.

Exemplary embodiments of the present disclosure are hereinafter described more fully with reference to the accompany drawings. However, the exemplary embodiments may be implemented in a plurality of manners, and shall not be construed as being limited to the implementations described herein. Instead, such exemplary embodiments are provided to more thoroughly and completely illustrate the present disclosure, and fully convey the concepts of the exemplary embodiments to persons skilled in the art. In the drawings, like reference numerals denote like or similar structures or elements. Therefore, repetitive descriptions thereof are not given any further.

In addition, the described characteristics, structures, or features may be incorporated in one or more embodiments in any suitable manner. In the description hereinafter, more details are provided such that sufficient understanding of the embodiments of the present disclosure may be achieved. However, a person skilled in the art would be aware that the technical solutions of the present disclosure may be practiced without one or more of the specific details, or may be practiced using other methods, components, materials, apparatuses, steps or the like. Under other circumstances, commonly known structures, methods, apparatuses, practices, materials or operations are not illustrated or described in detail to avoid various aspects of the present disclosure from becoming ambiguous.

The block diagrams illustrated in the drawings are merely functional entities, but are not necessarily physically independent entities. That is, these functional entities may be implemented by means of software, or these functional entities or a portion of these functional entities may be implemented in one or a plurality of software hardened modules, or these functional entities may be implemented in different networks and/or processor apparatuses and/or microcontroller apparatuses.

The present disclosure provides a real-time drawing system, and a security inspection system and method for use in a large-scale target, such that a security inspection personnel knows a scanning progress and makes a preliminary judgment on a to-be-inspected object based on a real-time image.

Figure 1B:
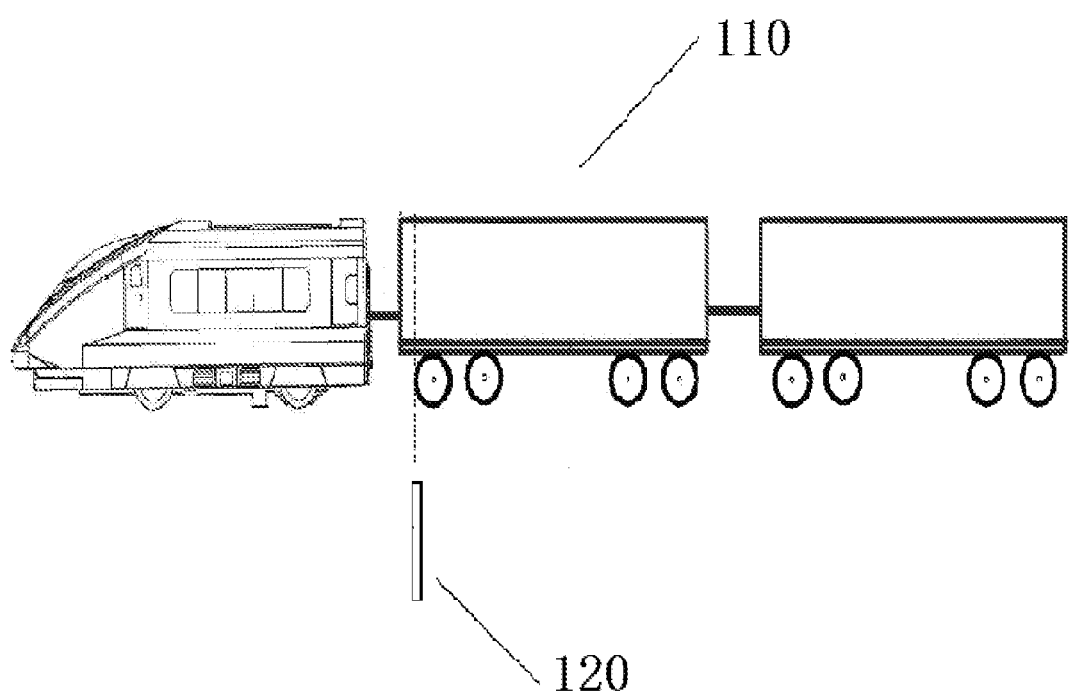
FIG. 1B schematically illustrates a train type identification according to some embodiments of the present disclosure.

FIG. 1A schematically illustrates a line-scan camera 120 for use in a train type identification apparatus according to some embodiments of the present disclosure. FIG. 1B schematically illustrates a train type identification according to some embodiments of the present disclosure.

As illustrated in FIG. 1A and FIG. 1B, a line-scan camera 120 may be used to photograph a train 110 for train type identification.

In a conventional train type identification method, a wheelbase detection method is generally employed. In this method, a plurality of inspection points need to be deployed along a railway, and magnetic steel is deployed at each inspection point. A relative speed and a shaft position of the train are detected to determine the wheelbase. This method has a high cost and lacks flexibility. In addition, sometimes the carriages of a train are refitted, but the wheelbase is not changed. As such, carrying objects in the carriage may not be identified via inspecting the wheelbase.

With the train type identification method according to the present disclosure, train type identification may be implemented by using a train image acquired by the line-scan camera 120.

Figure 2:
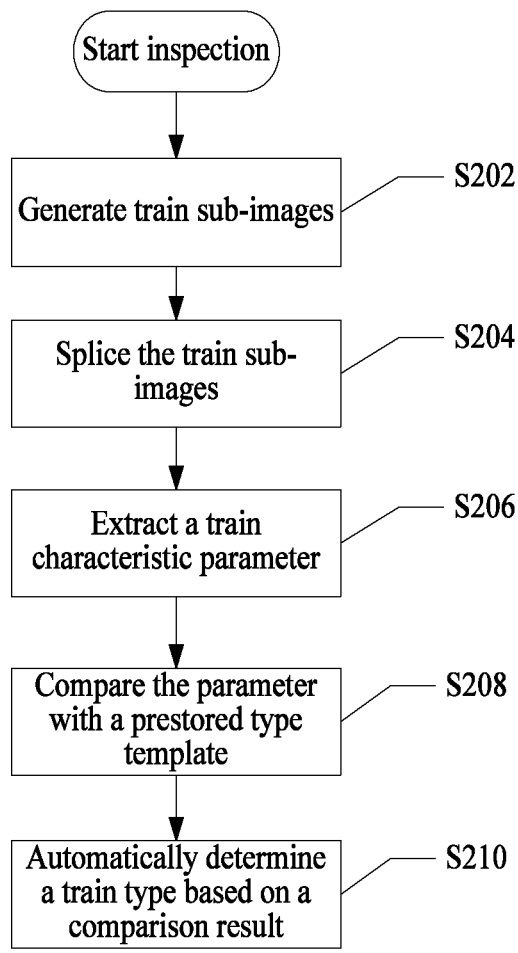
FIG. 2 illustrates a train type identification method according to some embodiments of the present disclosure.

FIG. 2 illustrates a train type identification method according to some embodiments of the present disclosure.

Referring to FIG. 2, in step S202, with the train type identification method according to the present disclosure, a line-scan camera in motion relative to a to-be-inspected train continuously photographs the to-be-inspected train to generate a plurality of train sub-images. Principles and usage of the line-scan camera are well known, which are not described herein any further. During photographing of the to-be-inspected train by using the line-scan camera, the line-scan camera may be arranged on a side of the train to acquire a side image of the train. However, the present disclosure sets no limitation thereto. For example, the line-scan camera may also be arranged above the train according to the actual needs, to acquire a top image of the train. Alternatively, line-scan cameras may be arranged in a plurality of positions to acquire train images from more directions.

In step S204, the plurality of train sub-images are spliced to acquire a train image of the to-be-inspected train. For example, the plurality of train sub-images may be spliced by using a computer image processing system to acquire the train image. As described hereinafter, in the image splicing process, the image may be processed. Alternatively, the image may be processed according to the actual condition upon completion of splicing.

In step S206, at least one train characteristic parameter is extracted from the train image. For example, a train characteristic parameter may be extracted by means of image processing, for example, wheelbase, train height, wheel profile, the quantity of windows, train color, the quantity of shafts, and the like characteristics. The extraction of the characteristic parameter may be carried out by using a method commonly known in the image processing field, which is not described herein any further.

In step S208, the at least one train characteristic parameter is compared with a prestored train type template. For example, the wheelbase, train height, train profile and/or other characteristic parameters are compared with the pre-stored type template to acquire a comparison result. For example, the train characteristic parameters stored in a database may be various parameter indicators of the train, for example, wheelbase, length, width and height, and dimension and position of a projecting portion. The train characteristic parameters may also be profile images or clear images, and a train template image with a high coincidence proportion may be acquired by means of subtraction and coincidence comparison.

In step S210, a type of the to-be-inspected train is automatically determined based on the comparison result. If the similarity of the comparison result displayed in a pre-stored train template exceeds a predetermined threshold, the train type may be automatically determined. The type may include at least one of locomotive, passenger train and freight train. According to the type, it may be determined whether to emit rays for security inspection.

For example, according to some embodiments, a similarity weight of each characteristic parameter may be pre-defined, and during the comparison, a sum of similarities of various used characteristic parameters is calculated, and then a type template having a maximum similarity with the train image of the to-be-detected train and having the similarity exceeding a predetermined threshold (for example, a similarity of 80%) is selected, to determine the type of the to-be-inspected train. It is easy to understand that the method according to the present disclosure may use various judgment policies, which are not limited to the manners described herein.

Distortion of the train image may affect judgment of the train type. The distortion of the train image is related to the train speed and the photographing frequency of the camera. According to some embodiments of the present disclosure, the line-scan camera may be controlled to continuously photograph the to-be-inspected train at a photographing frequency calculated based on a relative speed of the to-be-detected train.

It is easy to understand that, the proportion of the relative speed of the to-be-inspected train within each time segment and the quantity of train sub-images within the time segment is determined by an object width identified by each imaging unit of the line-scan camera per second.

For example, assume that the focal distance f of the line-scan camera is 35 mm, a width d (which is generally the width of a pixel point in the line-scan camera) of an imaging element; nevertheless, if the line-scan camera uses n pixels, a width of the imaging element is corresponding n times of the width of one pixel point) is 14 μm, an object distance h is 2.5 m, an object width (the width of an object to be identified by each imaging element) W=d×h/f=1 mm, then a magnification of the line-scan camera in this case is h/f=7143. Assume that a photographing frequency of the line-scan camera is 10 kHz, whereas an object width identified by each imaging element per second is D=10000 images×1 mm=10 m, that is, each imaging element has an identification rate of 10 m/s=36 km/h. In this case, a ratio of the relative speed of the train within each time segment to the quantity of train sub-images within the time segment is 36 km/h÷10000 images/s=1 mm/image (herein the time segment is 1 s), wherein this ratio is the object width w identified by each imaging element. If the train passes a photographing region at a speed of 36 km/h, the line-scan camera is capable of acquiring an image with the same proportion with the physical object (which is not subject to compression or stretching) at the photographing frequency.

If the train passes the photographing region at a speed of 18 km/h, the original 10000 images/s is adjusted to 5000 images/s by using an algorithm, and the ratio of the relative speed of the train within each time segment to the quantity of train sub-images within the time segment is 18 km/h÷5000 images/s=1 mm/image (herein the time segment is also 1s), wherein this ratio is also the object width w identified by each imaging element. As derived from the above theory, the quantity of train sub-images that are used may be determined based on the train speed actually measured and the above ratio. In this way, the spliced train image may be a train image having no distortion.

There are a plurality of approaches available for measuring the train speed. The train speed may be directly measured by using a speed measurement radar and the like speed sensor arranged near the line-scan camera. Alternatively, the train speed may be also measured based on the time points the train passes two position sensors and based on the distance between the two position sensors by using two ground loops and/or photoelectric switch and/or electronic screen and the like position sensors. According to some embodiments, optionally, after the to-be-inspected train is detected by using a radar or a sensor, the line-scan camera is controlled to immediately photograph or start photographing upon a delay. For example, by using the photoelectric switch or electronic screen or the like position sensors, when the train comes, the sensor is blocked, such that the sensor senses the coming train. Alternatively, arrival of a train may be known by using the speed measurement radar and the like speed sensor. Optionally, the speed of the train may be fed back in real time, and the frequency in photographing, by the line-scan camera, the train to generate the train sub-images may be adjusted based on the fed back speed, such that the train sub-image generating frequency of the line-scan camera within each time segment is proportional to the average speed of the train within the time segment, thereby preventing image distortion. The sensor may be arranged adjacent to the line-scan camera, and when the train reaches within a sensing range of the sensor, the sensor issues an instruction in real time to instruct the line-scan camera to immediately photograph the train. Alternatively, the sensor may also be arranged before the line-scan camera at a predetermined distance. When the sensor detects that the train arrives, the sensor instructs the line-scan camera to immediately photograph the train, or instructs the line-scan camera to start photographing the train upon a specific delay.

It is easy to understand that the line-scan camera may be controlled to continuously photograph the to-be-inspected train at a predetermined photographing frequency.

Figure 3:
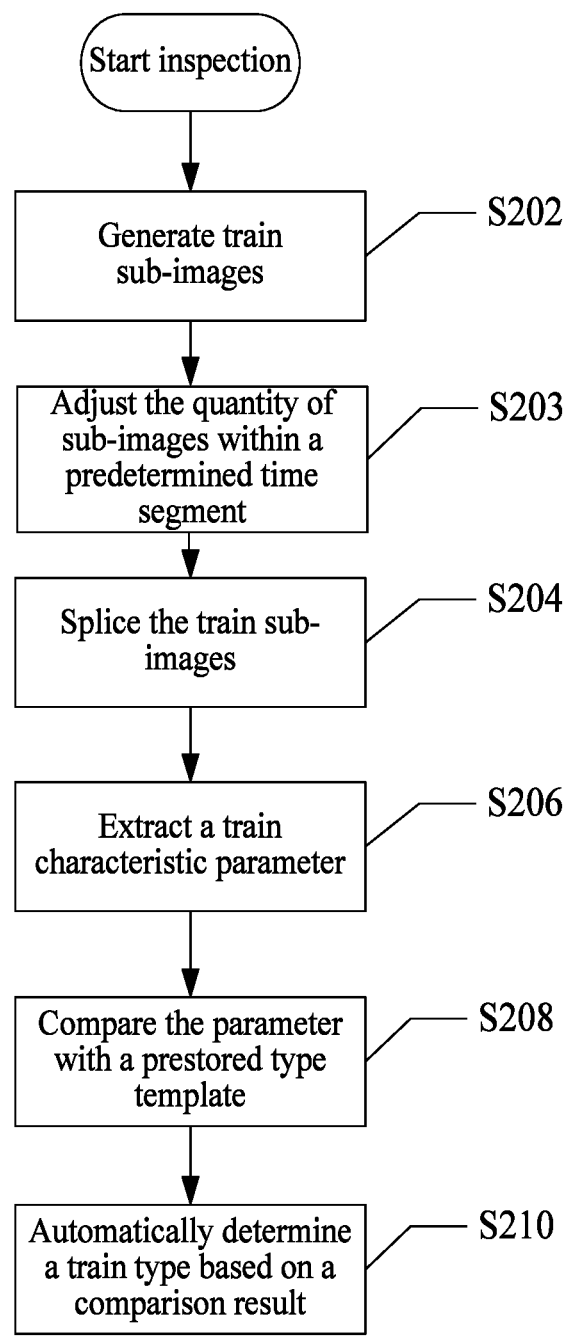
FIG. 3 illustrates a train type identification method according to some embodiments of the present disclosure.

FIG. 3 illustrates a train type identification method according to some embodiments of the present disclosure. The embodiment illustrated in FIG. 3 is substantially the same as the embodiment illustrated in FIG. 2, and the difference only lies in that the line-scan camera photographs the train at a predetermined photographing frequency (for example, if the photographing frequency of the line-scan camera is 10 kHz, that is, 10000 images/s, one train sub-image is generated per 1/10000 second), and the train sub-images are adjusted. The difference from the embodiment illustrated in FIG. 2 is only described hereinafter.

In step S203, the quantity of sub-images is adjusted. For example, contiguous time segments may be defined, and the quantity of train sub-images within each time segment may be adjusted according to a relative speed of the to-be-inspected train in each time segment based on the above described principles, such that a proportion of the relative speed of the to-be-inspected train within each time segment and the quantity of train sub-images within the time segment remains consistent.

If the relative speed of the to-be-inspected train is lower than a relative speed corresponding to the predetermined photographing frequency, at least one train sub-image may be subtracted, according to a predetermined rule, from the train sub-images acquired within the time segment. If the relative speed of the to-be-inspected train is higher than the relative speed corresponding to the predetermined photographing frequency, at least one train sub-image may be added into the train sub-images acquired within the time segment by means of interpolation.

For example, the time segment may be defined via calculation according to the quantity of train sub-images and/or train speed, or may be manually defined, which may be 1 s or 10 s. Generally, a high train speed indicates a high photographing frequency of the line-scan camera and a shorter defined time segment. However, generally more than one train sub-image is generated within a time segment. The train speed within each time segment may be an average speed of the train within the time segment or the speed of the train at the beginning or end of this time segment.

According to some embodiments, the line-scan camera, at a maximum photographing frequency, acquires a maximum number of train sub-images within a train inspection time period (that is, time duration for inspecting passage of the entire train). If the speed of the to-be-inspected train within a time segment is lower than the maximum speed, the quantity of train sub-images within this time segment is reduced by means of value subtraction according to a difference between the actual speed and the maximum speed, such that the train speed within each time segment is approximately proportional to the quantity of train sub-images generated, so as to prevent image distortion caused by the train speed. For example, if the maximum speed of the train within the inspection time period is 30 km/h, a corresponding photographing frequency of 50 images/s (that is, the frequency of generating the train sub-images), and if the train speed within a time segment is measured to be 24 km/h, the quantity of images within this time segment changes to 40 images/s accordingly, that is, one image is subtracted from each five images. The images may be subtracted according to a predetermined rule, for example, subtracting the third image from each five images. As such, it is ensured that the train speed is proportional to the quantity of train sub-images, such that the train image obtained via splicing the train sub-images acquired within each time segment by the line-scan camera is subject to no distortion.

According to some embodiments, the line-scan camera photographs the train at an average photographing frequency, which corresponds to a most frequent train speed or an average train speed within the inspection time period. If the train speed within a time segment is higher than the most frequent train speed or the average train speed, value compensation is employed for the sake of no distortion. For example, two images continuously photographed at a suitable position within the time segment are subject to fitting and smoothing, to achieve value compensation between the two train sub-images to form new train sub-images. In this way, the obtained image, although having a lower resolution than that of the train sub-image obtained via photographing, has an equal proportion relationship in the image in terms of distance, to the train profile and the actual train. If the train speed within a time segment is lower than the most frequent train speed, the quantity of sub-images is reduced via the above value subtraction. For example, if the average speed of the train is 30 km/h, a corresponding photographing frequency of 50 images/s (that is, the frequency of generating the train sub-images), and if the train speed within a time segment is measured to be 36 km/h, the quantity of images within this time segment changes to 60 images/s accordingly, that is, one image is added to each five images. For example, a new train sub-image obtained via fitting or averaging may be added between the second train sub-image and the third train sub-image. This ensures that the train speed is in direct proportional to the quantity of generated train sub-images.

Figure 4:
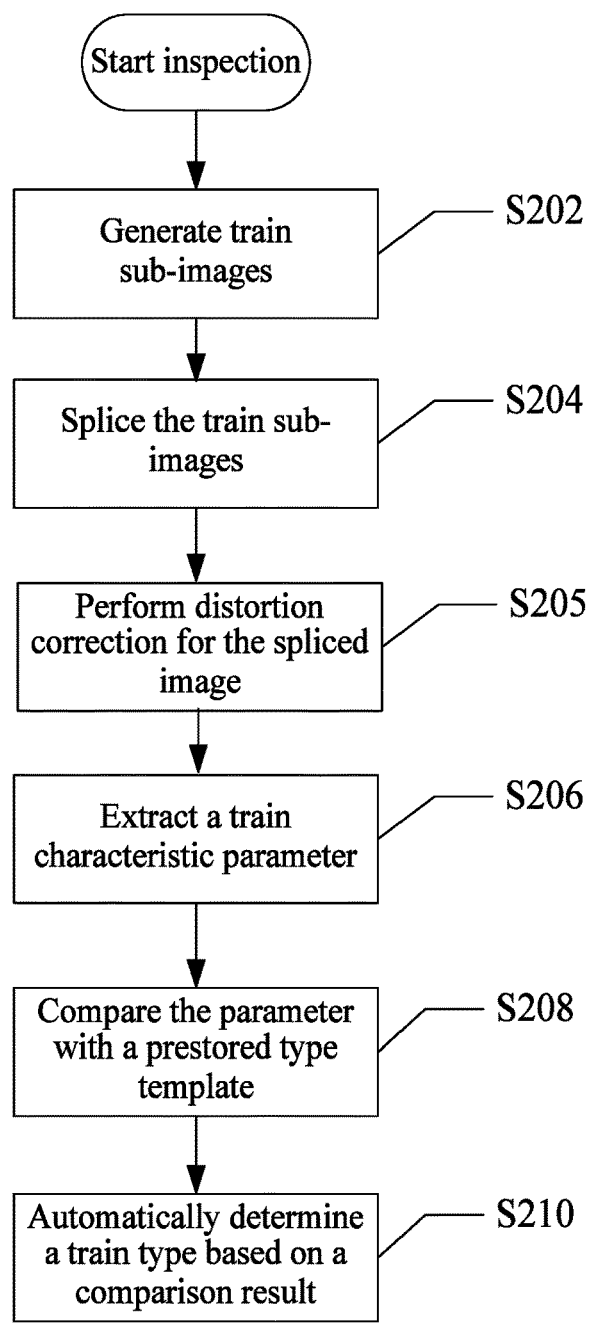
FIG. 4 illustrates a train type identification method according to some embodiments of the present disclosure.

FIG. 4 illustrates a train type identification method according to some embodiments of the present disclosure. The embodiment illustrated in FIG. 4 is substantially the same as the embodiment illustrated in FIG. 2, and the difference only lies in that the embodiment illustrated in FIG. 4 further includes performing distortion correction for the spliced image. The difference from the embodiment illustrated in FIG. 2 is only described hereinafter.

In step S205, distortion correction is performed for the spliced image. Various methods may be used to correct the spliced image to acquire the train image. According to some embodiments of the present disclosure, the image is corrected by using the wheel profile as a reference. Such a correction manner is simple and effective, and may improve the processing efficiency and reduce the processing cost. For example, after a spliced image is acquired, the wheel profile may be extracted from the spliced image. Afterwards, a ratio of a wheel horizontal diameter and a wheel vertical diameter is acquired from the wheel profile. If the ratio is greater than a first predetermined threshold, horizontal compression is performed for the spliced image based on the ratio; and if the ratio is less than a second predetermined threshold, horizontal stretching is performed for the spliced image based on the ratio. Finally, a train image having little distortion is acquired for facilitating subsequent operations.

For the convenience of reviewing the image by an operator, according to some embodiments, a coupler (i.e., a coupler between train carriages, used for coupling the carriages) position of the train may be identified in the acquired train image, and then the train image may be partitioned into a plurality of train sub-images according to the coupler position.

The train type identification method according to the present disclosure is described above. A train type identification system which may implement the above described method is described hereinafter.

Figure 5:
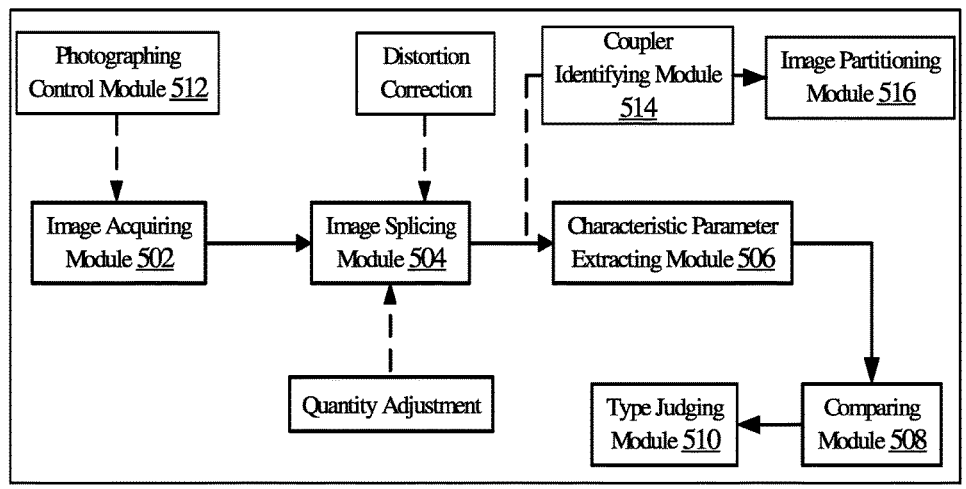
FIG. 5 illustrates a train type identification system according to some embodiments of the present disclosure.

As illustrated in FIG. 5, a train type identification system according to some embodiments of the present disclosure may include an image acquiring module 502, an image splicing module 504, a characteristic parameter extracting module 506, a comparing module 508 and a type judging module 510.

The image acquiring module 502 is configured to continuously photograph a to-be-inspected train by using a line-scan camera in motion relative to the to-be-inspected train, and generate a plurality of train sub-images. The image splicing module 504 is configured to splice the plurality of train sub-images to acquire a train image of the to-be-inspected train. The characteristic parameter extracting module 506 is configured to extract at least one train characteristic parameter from the train image. The comparing module 508 is configured to compare the at least one train characteristic parameter with a prestored train type template. The type judging module 510 is configured to automatically determine a type of the to-be-inspected train according to a comparison result. These modules may implement relevant portions of the above described method, which are not described herein any further.

Corresponding to the above described method, the type judging module 510 is configured to: select, according to a predetermined similarity weight of each of the at least one train characteristic parameter, a type template having a maximum similarity with the train image of the to-be-inspected train and having the similarity exceeding a predetermined threshold, to determine the type of the to-be-inspected train. The train characteristic parameter may include at least one of wheelbase, train height, train profile, the quantity of windows, train color, and the quantity of shafts.

According to some embodiments, the system may further include a photographing control module 512, configured to continuously photograph the to-be-inspected train according to a photographing frequency calculated according to a relative speed of the to-be-inspected train. Alternatively, the image acquiring module 502 acquires a plurality of train sub-images photographed by the line-scan camera according to a predetermined photographing frequency.

Corresponding to the above described method, the image splicing module 504 is further configured to define contiguous time segments, and adjust the quantity of train sub-images within each time segment according to a relative speed of the to-be-inspected train in each time segment, such that a proportion of the relative speed of the to-be-inspected train within each time segment and the quantity of train sub-images within the time segment remains consistent. If the relative speed of the to-be-inspected train is lower than a relative speed corresponding to the predetermined photographing frequency, at least one train sub-image is subtracted, according to a predetermined rule, from the train sub-images acquired within the time segment; and if the relative speed of the to-be-inspected train is higher than the relative speed corresponding to the predetermined photographing frequency, at least one train sub-image is added into the train sub-images acquired within the time segment by means of interpolation.

Corresponding to the above described method, the image splicing module 504 may be further configured to perform distortion correction for the spliced image. For example, the performing distortion correction for the spliced image includes: extracting a wheel profile from the spliced image; acquiring a ratio of a wheel horizontal diameter and a wheel vertical diameter from the wheel profile; and if the ratio is greater than a first predetermined threshold, performing horizontal compression for the spliced image based on the ratio; and if the ratio is less than a second predetermined threshold, performing horizontal stretching for the spliced image based on the ratio.

Corresponding to the above described method, the system may include a coupler identifying module 514 and an image partitioning module 516. The coupler identifying module 514 is configured to identify a coupler position of the train. The image partitioning module 516 is configured to partition the train image into a plurality of train sub-images based on the coupler position.

In another example, the train type identification system illustrated in FIG. 5 may be implemented by a processor and a memory for storing instructions executable by the processor. In the system, the processor is configured to perform: continuously photographing a to-be-inspected train by using a line-scan camera in motion relative to the to-be-inspected train, and generating a plurality of train sub-images; splicing the plurality of train sub-images to acquire a train image of the to-be-inspected train; extracting at least one train characteristic parameter from the train image; comparing the at least one train characteristic parameter with a prestored train type template; and automatically determining a type of the to-be-inspected train based on a comparison result.

The processor may be further configured to perform any step or steps of the above methods, repetitive description of which are omitted herein.

Figure 6:
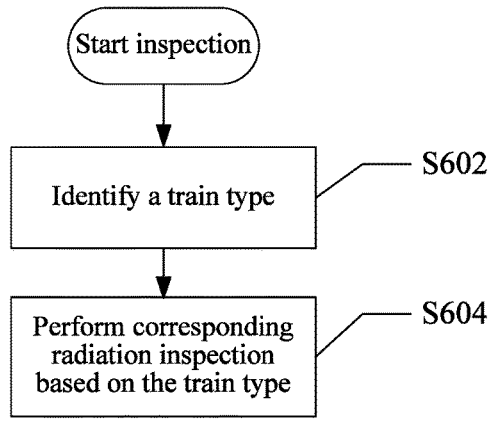
FIG. 6 illustrates a train security inspection method according to some embodiments of the present disclosure.

Train security inspection may be implemented by using the train type identification method according to the present disclosure, as illustrated in FIG. 6.

In step S602, a type of a to-be-inspected train entering an inspection region is identified by using the train type identification method as described above.

In step S604, corresponding irradiation inspection is performed according to the type. If the to-be-inspected train is a locomotive or a passenger train, the to-be-inspected train is irradiated with a low dosage or the to-be-inspected train is not irradiated; and if the to-be-inspected train is a freight train, the to-be-inspected train is irradiated with a high dosage.

Figure 7:
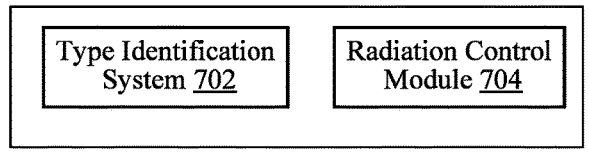
FIG. 7 illustrates a train security inspection system according to some embodiments of the present disclosure.

FIG. 7 illustrates a train security inspection system according to some embodiments of the present disclosure, which may implement the train security inspection method as described above.

As illustrated in FIG. 7, the train security inspection system may include the train type identification system 702 as described above and a radiation control module 704. The radiation control module 704 is configured to judge a type of a to-be-inspected train by using the train type identification system, control a ray source to irradiate the to-be-inspected train with a first dosage or not to irradiate the to-be-inspected train when the to-be-inspected train is a locomotive or a passenger train, and control the ray source to irradiate the to-be-inspected train with a second dosage when the to-be-inspected train is a freight train, wherein the first dosage is less than the second dosage. The train type identification system 702 may be as described above, which is not described herein any further.

Through the above detailed description, a person skilled in the art would easily understand that the system and method according to the embodiments of the present disclosure has one or more of the following advantages.

Train type identification by using the characteristic parameter improves the accuracy in train type identification, and implements identification of refitted trains.

Adjustment of the quantity of train sub-images or distortion correction for the image improves the identification accuracy.

Distortion correction by using the wheel profile is simple and convenient in operation.

Based on the above description of the embodiments, a person skilled in the art would easily understand that the method and corresponding modules according to the embodiments of the present disclosure may be implemented by means of software or partially hardening of the software. Based on such understandings, the technical solutions according to the embodiments of the present disclosure may be essentially embodied in the form of a software product. The software product may be stored in a non-volatile storage medium such as a CD-ROM, a U disk, a mobile hard disk and the like. The software product comprises a number of instructions that enable a computer device (e.g., a PC, a server, a mobile terminal, a network device, or the like) to perform the methods provided in the embodiments of the present disclosure.

A person skilled in the art may understand that the accompanying drawings are only intended to schematically illustrate the exemplary embodiments, and the modules or procedures in the drawings are not necessarily included for implementing the present disclosure, which thus impose no limitation to the protection scope of the present disclosure.

A person skilled in the art would understand that the above modules may be arranged in the apparatus according to the description given in the embodiments, or may be subject to corresponding variations and arranged in one or a plurality of apparatuses different from that in the embodiments. The modules according to the above embodiments may be combined into one module, or may be split into a plurality of sub-modules.

Detailed above are exemplary embodiments of the present disclosure. It shall be understood that the present disclosure is not limited to the above exemplary embodiments. Instead, the present disclosure is intended to cover various modifications and equivalent deployments within the spirit and scope of the appended claims.

The invention claimed is:

1. A train type identification method, comprising:
   continuously photographing a to-be-inspected train by using a line-scan camera in motion relative to the to-be-inspected train, and generating a plurality of train sub-images, wherein the line-scan camera continuously photographs the to-be-inspected train at a predetermined photographing frequency;
   splicing the plurality of train sub-images to acquire a train image of the to-be-inspected train, wherein the splicing the plurality of train sub-images comprises: defining contiguous time segments, and adjusting the quantity of train sub-images within each time segment based on a relative speed of the to-be-inspected train in each time segment, such that a ratio of the relative speed of the to-be-inspected train within each time segment and the quantity of train sub-images within the time segment remains consistent;
   extracting at least one train characteristic parameter from the train image;
   comparing the at least one train characteristic parameter with a prestored train type template; and
   automatically determining a type of the to-be-inspected train based on a comparison result.

2. The train type identification method according to claim 1, wherein the type comprises at least one of locomotive, passenger train and freight train.

3. The train type identification method according to claim 1, wherein the automatically determining a type of the to-be-inspected train based on a comparison result comprises: selecting, based on a predetermined similarity weight of each of the at least one train characteristic parameter, a type template having a maximum similarity with the train image of the to-be-inspected train and having the similarity exceeding a predetermined threshold, to determine the type of the to-be-inspected train.

4. The train type identification method according to claim 3, wherein the at least one train characteristic parameter comprises at least one of wheelbase, train height, train profile, the quantity of windows, train color, and the quantity of shafts.

5. The train type identification method according to claim 1, wherein the adjusting the quantity of train sub-images within each time segment comprises: if the relative speed of the to-be-inspected train is lower than a relative speed corresponding to the predetermined photographing frequency, subtracting, based on a predetermined rule, at least one train sub-image from the train sub-images acquired within the time segment; and if the relative speed of the to-be-inspected train is higher than the relative speed corresponding to the predetermined photographing frequency, adding at least one train sub-image into the train sub-images acquired within the time segment by means of interpolation.

6. The train type identification method according to claim 1, wherein the ratio of the relative speed of the to-be-inspected train within each time segment and the quantity of train sub-images within the time segment is determined by an object width identified by each imaging unit of the line-scan camera per second.

7. The train type identification method according to claim 1, wherein the splicing the plurality of train sub-images to acquire a train image of the to-be-inspected train further comprises:
   performing distortion correction for the spliced image.

8. The train type identification method according to claim 7, wherein the performing distortion correction for the spliced image comprises:
   extracting a wheel profile from the spliced image;
   acquiring a ratio of a wheel horizontal diameter and a wheel vertical diameter from the wheel profile; and
   if the ratio is greater than a first predetermined threshold, performing horizontal compression for the spliced image based on the ratio; and if the ratio is less than a second predetermined threshold, performing horizontal stretching for the spliced image based on the ratio.

9. The train type identification method according to claim 1, further comprising:
   identifying a coupler position of the train; and
   partitioning the train image into a plurality of train sub-images based on the coupler position.

10. A train type identification system, comprising:
    a processor; and
    a memory for storing instructions executable by the processor;
    wherein the processor is configured to perform:
    continuously photographing a to-be-inspected train by using a line-scan camera in motion relative to the to-be-inspected train, and generating a plurality of train sub-images wherein the line-scan camera continuously photographs the to-be-inspected train at a photographing frequency calculated based on a relative speed of the to-be-inspected train; or
    wherein the line-scan camera continuously photographs the to-be-inspected train at a predetermined photographing frequency;
    splicing the plurality of train sub-images to acquire a train image of the to-be-inspected train where the splicing comprises:
      defining contiguous time segments, and
      adjusting the quantity of train sub-images within each time segment based on a relative speed of the to-be-inspected train in each time segment, such that a ratio of the relative speed of the to-be-inspected train within each time segment and the quantity of train sub-images within the time segment remains consistent;
    extracting at least one train characteristic parameter from the train image;
    comparing the at least one train characteristic parameter with a prestored train type template; and
    automatically determining a type of the to-be-inspected train based on a comparison result.

11. The train type identification system according to claim 10, wherein the type comprises at least one of locomotive, passenger train and freight train.

12. The train type identification system according to claim 10, wherein the processor is further configured to perform: selecting, based on a predetermined similarity weight of each of the at least one train characteristic parameter, a type template having a maximum similarity with the train image of the to-be-inspected train and having the similarity exceeding a predetermined threshold, to determine the type of the to-be-inspected train;
wherein the at least one train characteristic parameter comprises at least one of wheelbase, train height, train profile, the quantity of windows, train color, and the quantity of shafts.

13. The train type identification system according to claim 10, wherein the processor is further configured to perform: if the relative speed of the to-be-inspected train is lower than a relative speed corresponding to the predetermined photographing frequency, subtracting, based on a predetermined rule, at least one train sub-image from the train sub-images acquired within the time segment; and if the relative speed of the to-be-inspected train is higher than the relative speed corresponding to the predetermined photographing frequency, adding at least one train sub-image into the train sub-images acquired within the time segment by means of interpolation;
wherein the ratio of the relative speed of the to-be-inspected train within each time segment and the quantity of train sub-images within the time segment is determined by an object width identified by each imaging unit of the line-scan camera per second.

14. The train type identification system according to claim 10, wherein the processor is further configured to perform:
performing distortion correction for the spliced image, which comprises:
extracting a wheel profile from the spliced image;
acquiring a ratio of a wheel horizontal diameter and a wheel vertical diameter from the wheel profile; and
if the ratio is greater than a first predetermined threshold, performing horizontal compression for the spliced image based on the ratio; and if the ratio is less than a second predetermined threshold, performing horizontal stretching for the spliced image based on the ratio.

15. The train type identification system according to claim 10, wherein the processor is further configured to perform:
identifying a coupler position of the train; and
partitioning the train image into a plurality of train sub-images based on the coupler position.

16. A train security inspection method, comprising:
identifying a type of a to-be-inspected train entering an inspection region by using a train type identification method according to claim 1; and
if the to-be-inspected train is a locomotive or a passenger train, irradiating the to-be-inspected train with a low dosage or not irradiating the to-be-inspected train; and
if the to-be-inspected train is a freight train, irradiating the to-be-inspected train with a high dosage.

* * * * *